US008839522B2

(12) United States Patent
Walters

(10) Patent No.: US 8,839,522 B2
(45) Date of Patent: Sep. 23, 2014

(54) INTERLOCKING CUTLERY AND RELATED METHODS

(75) Inventor: Richard S. Walters, Port Washington, WI (US)

(73) Assignee: Dixie Consumer Products LLC, Atlanta, GA (US)

( * ) Notice: Subject to any disclaimer, the term of this patent is extended or adjusted under 35 U.S.C. 154(b) by 242 days.

(21) Appl. No.: 13/188,528

(22) Filed: Jul. 22, 2011

(65) Prior Publication Data

US 2012/0036724 A1 Feb. 16, 2012

Related U.S. Application Data

(60) Provisional application No. 61/373,017, filed on Aug. 12, 2010.

(51) Int. Cl.
*A47J 45/00* (2006.01)
*A41F 11/04* (2006.01)

(52) U.S. Cl.
USPC ................................................ 30/142; 30/322

(58) Field of Classification Search
USPC ............ 30/142, 322, 323, 324–328, 329, 123
See application file for complete search history.

(56) References Cited

U.S. PATENT DOCUMENTS 46,832 A * 3/1865 Thorne ............................ 30/143
592,105 A 10/1897 Barnes
D32,913 S * 7/1900 Graf ................................ D7/653
703,718 A * 7/1902 Cammann ......................... 24/666
716,058 A 12/1902 Lang et al.
925,485 A 2/1909 Lefler
999,837 A 8/1911 Morris et al.
1,053,387 A * 2/1913 Hawley ............................ 30/147
1,146,447 A 7/1915 Prommel
1,182,793 A 5/1916 Richardson
1,259,927 A 3/1918 Swift
1,261,835 A * 4/1918 Martin ............................. 24/666
1,353,109 A * 9/1920 Carr ........................... 24/102 SL (Continued)

FOREIGN PATENT DOCUMENTS

CA 2545745 A1 11/2006
CN 2865478 Y 2/2007

(Continued)

OTHER PUBLICATIONS

International Search Report and Written Opinion of the International Searching Authority for PCT/US2011/044931 mailed Feb. 28, 2012.

(Continued)

*Primary Examiner* — Sean Michalski
(74) *Attorney, Agent, or Firm* — William W. Letson

(57) ABSTRACT

A utensil that includes a functional end and a handle associated with the functional end. The handle includes a longitudinal axis, a first surface, and a second surface. The first surface includes at least one protrusion configured to separably couple the utensil to a second utensil. The second surface is configured to receive at least a portion of a third utensil. The at least one protrusion is configured such that the utensil and the second utensil are configured to be at least one of coupled and decoupled with respect to one another via relative movement in a plane parallel to a reference plane that intersects a plane extending between the first and second surfaces.

20 Claims, 13 Drawing Sheets

(56) References Cited

U.S. PATENT DOCUMENTS

| | | | | | |
|---|---|---|---|---|---|
| 1,355,583 | A | | 10/1920 | Zeidler et al. | |
| 1,482,071 | A | | 1/1924 | Duff et al. | |
| 1,497,585 | A | * | 6/1924 | Poole | 24/680 |
| 1,504,098 | A | | 8/1924 | Cathey | |
| 1,546,077 | A | | 7/1925 | Hunter et al. | |
| 1,547,151 | A | | 7/1925 | Watling | |
| 1,560,938 | A | | 11/1925 | Lund | |
| 1,577,302 | A | | 3/1926 | Schultz | |
| 1,610,001 | A | | 12/1926 | Foster | |
| 1,635,386 | A | * | 7/1927 | Pierson | 24/666 |
| 1,675,510 | A | | 7/1928 | Nolan | |
| 1,767,634 | A | | 6/1930 | Weiss | |
| 1,821,377 | A | * | 9/1931 | Cusick | 24/3.6 |
| 1,886,378 | A | | 11/1932 | Dearsley | |
| 1,936,057 | A | * | 11/1933 | Hodge | 24/321 |
| 2,053,828 | A | | 9/1936 | Harper | |
| 2,078,984 | A | | 5/1937 | Williamson | |
| 2,089,378 | A | * | 8/1937 | Dagmar | 24/478 |
| 2,110,189 | A | | 3/1938 | Zeidler, Sr. | |
| 2,141,684 | A | | 12/1938 | Diemer | |
| 2,149,098 | A | | 2/1939 | Phinney | |
| 2,149,099 | A | | 2/1939 | Phinney et al. | |
| 2,160,374 | A | * | 5/1939 | Veillette | 24/691 |
| 2,188,573 | A | | 1/1940 | Longo | |
| 2,207,528 | A | | 7/1940 | Witt | |
| 2,223,347 | A | * | 12/1940 | Hermine | 24/387 |
| 2,239,196 | A | | 4/1941 | Lunvik | |
| 2,246,852 | A | * | 6/1941 | Kale | 24/666 |
| 2,260,596 | A | | 10/1941 | Young | |
| 2,268,596 | A | | 1/1942 | Jerum | |
| 2,268,873 | A | | 1/1942 | Hopkins et al. | |
| 2,328,486 | A | * | 8/1943 | Painter | 24/479 |
| 2,340,561 | A | | 2/1944 | Renfro | |
| 2,421,782 | A | | 6/1947 | Gibbs et al. | |
| 2,427,321 | A | | 9/1947 | Casey et al. | |
| 2,472,051 | A | | 5/1949 | Testi | |
| 2,503,741 | A | | 4/1950 | Johnson | |
| 2,526,136 | A | * | 10/1950 | Holzknecht | 24/667 |
| 2,571,668 | A | | 10/1951 | Booth et al. | |
| 2,577,344 | A | | 12/1951 | Masure | |
| 2,624,093 | A | * | 1/1953 | Hatch et al. | 24/487 |
| 2,635,025 | A | | 4/1953 | Ziska | |
| 2,646,874 | A | | 7/1953 | Testi | |
| 2,651,093 | A | * | 9/1953 | Lynch | 24/666 |
| 2,671,555 | A | | 3/1954 | Shnitzler | |
| 2,692,691 | A | | 10/1954 | Harriss et al. | |
| 2,752,678 | A | | 7/1956 | Welch | |
| 2,800,013 | A | * | 7/1957 | George | 15/235.4 |
| 2,806,634 | A | | 9/1957 | Baumgartner | |
| 2,843,909 | A | * | 7/1958 | Eilertsen | 24/464 |
| 2,845,679 | A | * | 8/1958 | Baruch | 24/495 |
| 2,857,645 | A | * | 10/1958 | Vogelsang | 24/471 |
| 2,868,344 | A | | 1/1959 | Shields | |
| 2,870,505 | A | * | 1/1959 | Hawie | 24/316 |
| 2,877,490 | A | * | 3/1959 | Greninger | 403/30 |
| 2,877,926 | A | | 3/1959 | Abbe | |
| 2,880,907 | A | | 4/1959 | Mainers | |
| 2,889,076 | A | | 6/1959 | Van Schie | |
| 2,911,127 | A | | 11/1959 | Driss et al. | |
| 2,924,357 | A | | 2/1960 | Kingsley et al. | |
| 2,946,431 | A | | 7/1960 | Nissen | |
| 2,954,948 | A | | 10/1960 | Johnson | |
| 2,965,262 | A | | 12/1960 | Du Bois | |
| 3,037,257 | A | * | 6/1962 | Girodet | 24/532 |
| 3,052,006 | A | * | 9/1962 | Jonas | 24/478 |
| 3,083,879 | A | | 4/1963 | Coleman | |
| 3,095,114 | A | | 6/1963 | Tobias | |
| 3,100,842 | A | | 8/1963 | Tellefsen | |
| 3,114,475 | A | | 12/1963 | Etes | |
| 3,132,765 | A | | 5/1964 | Florendo | |
| 3,146,908 | A | | 9/1964 | Perri et al. | |
| 3,163,327 | A | | 12/1964 | Maxwell | |
| 3,180,489 | A | | 4/1965 | McGinn | |
| 3,182,345 | A | * | 5/1965 | Smith | 15/176.6 |
| 3,263,860 | A | | 8/1966 | Haas | |
| 3,300,087 | A | | 1/1967 | Kuypers | |
| 3,313,452 | A | | 4/1967 | Katz | |
| 3,334,784 | A | | 8/1967 | Morrison | |
| 3,338,471 | A | | 8/1967 | De Good | |
| 3,371,821 | A | | 3/1968 | Abood, Jr. et al. | |
| 3,400,435 | A | * | 9/1968 | Urban | 24/474 |
| 3,402,441 | A | * | 9/1968 | De Woskin | 24/487 |
| 3,407,927 | A | | 10/1968 | Jones | |
| 3,408,708 | A | * | 11/1968 | Hawie | 24/478 |
| 3,426,941 | A | | 2/1969 | Hovekamp | |
| 3,435,491 | A | * | 4/1969 | Shears | 24/666 |
| 3,472,421 | A | | 10/1969 | Baller | |
| 3,499,538 | A | | 3/1970 | Sherard | |
| 3,558,006 | A | | 1/1971 | Redmond et al. | |
| 3,587,922 | A | | 6/1971 | Oriti | |
| 3,680,736 | A | | 8/1972 | Viessmann | |
| 3,786,959 | A | | 1/1974 | Greb et al. | |
| 4,091,915 | A | | 5/1978 | Claasen | |
| 4,134,519 | A | | 1/1979 | Barnett et al. | |
| 4,271,999 | A | * | 6/1981 | Stravitz | 224/257 |
| 4,308,974 | A | | 1/1982 | Jones | |
| 4,489,854 | A | | 12/1984 | Wenkman et al. | |
| 4,524,512 | A | * | 6/1985 | Formo et al. | 30/147 |
| 4,570,536 | A | | 2/1986 | Dodd | |
| 4,571,773 | A | | 2/1986 | Yuda | |
| 4,574,423 | A | | 3/1986 | Ito et al. | |
| D284,442 | S | * | 7/1986 | Chan | D7/645 |
| 4,610,087 | A | | 9/1986 | Mickelson et al. | |
| 4,614,004 | A | | 9/1986 | Oshida | |
| 4,662,536 | A | | 5/1987 | Powers | |
| 4,691,811 | A | | 9/1987 | Arakawa et al. | |
| 4,697,673 | A | | 10/1987 | Omata | |
| 4,715,514 | A | | 12/1987 | Vidondo | |
| 4,789,064 | A | | 12/1988 | Segal | |
| 4,835,864 | A | * | 6/1989 | Tang | 30/150 |
| 4,863,033 | A | | 9/1989 | Buj | |
| 4,896,792 | A | | 1/1990 | Marchand | |
| 4,973,037 | A | | 11/1990 | Holbrook | |
| 4,986,442 | A | | 1/1991 | Hinterreiter | |
| 4,995,154 | A | * | 2/1991 | Bamber | 30/147 |
| D318,600 | S | * | 7/1991 | Lillelund et al. | D7/643 |
| 5,080,257 | A | | 1/1992 | Carnisio | |
| 5,127,546 | A | | 7/1992 | Chen | |
| 5,131,586 | A | | 7/1992 | Capy | |
| 5,161,268 | A | * | 11/1992 | Harrow | 5/201 |
| 5,191,997 | A | | 3/1993 | Squitieri | |
| 5,211,267 | A | | 5/1993 | Clark | |
| 5,249,705 | A | | 10/1993 | Gates | |
| D342,648 | S | | 12/1993 | Cautereels et al. | |
| 5,269,397 | A | | 12/1993 | Kawamoto et al. | |
| 5,327,650 | A | * | 7/1994 | Rojas | 30/147 |
| D351,085 | S | * | 10/1994 | Schmidt | D7/507 |
| 5,364,016 | A | | 11/1994 | Capy et al. | |
| 5,413,317 | A | | 5/1995 | Spoerre | |
| D362,160 | S | * | 9/1995 | Brabeck et al. | D7/645 |
| 5,449,054 | A | | 9/1995 | Wiese et al. | |
| 5,460,252 | A | | 10/1995 | Kosugi et al. | |
| 5,469,688 | A | | 11/1995 | Dunbar et al. | |
| 5,479,708 | A | * | 1/1996 | Thomas | 30/122 |
| 5,497,863 | A | | 3/1996 | Schmidt et al. | |
| 5,509,522 | A | | 4/1996 | Laidlaw | |
| 5,542,508 | A | | 8/1996 | Van Erden et al. | |
| 5,564,594 | A | | 10/1996 | Monfredo | |
| 5,586,685 | A | | 12/1996 | Dorner et al. | |
| 5,590,472 | A | * | 1/1997 | Yaakov | 30/323 |
| 5,605,208 | A | | 2/1997 | Friedrichsen et al. | |
| 5,660,252 | A | | 8/1997 | Lafon | |
| 5,845,403 | A | * | 12/1998 | Nivin | 30/147 |
| 5,904,250 | A | * | 5/1999 | De Schutter | 206/553 |
| 5,921,408 | A | | 7/1999 | Groenewold et al. | |
| 5,933,918 | A | * | 8/1999 | Wallays | 16/114.1 |
| 5,961,021 | A | | 10/1999 | Koike et al. | |
| D420,887 | S | * | 2/2000 | Chen | D8/107 |
| 6,023,913 | A | | 2/2000 | Gray et al. | |
| 6,047,830 | A | | 4/2000 | Chang | |
| 6,085,916 | A | | 7/2000 | Kovacevic et al. | |
| 6,115,921 | A | * | 9/2000 | Garneau, Sr. | 30/123 |
| 6,134,790 | A | * | 10/2000 | Watson | 30/326 |
| 6,202,891 | B1 | | 3/2001 | Mark | |

(56) References Cited

U.S. PATENT DOCUMENTS

| | | | | |
|---|---|---|---|---|
| 6,226,845 | B1 * | 5/2001 | Fink | 24/668 |
| 6,250,498 | B1 | 6/2001 | Lovejoy | |
| 6,298,960 | B1 | 10/2001 | Derr | |
| 6,378,729 | B1 | 4/2002 | Kodama | |
| 6,412,398 | B1 * | 7/2002 | Norcross et al. | 99/342 |
| 6,415,465 | B1 * | 7/2002 | Harrow | 5/201 |
| 6,626,633 | B2 | 9/2003 | Jendzurski et al. | |
| 6,651,841 | B2 | 11/2003 | Tsuchida | |
| 6,749,074 | B1 | 6/2004 | Hileman et al. | |
| D492,549 | S | 7/2004 | Welch | |
| D493,337 | S | 7/2004 | Welch | |
| 6,763,972 | B2 | 7/2004 | Graupner | |
| 6,832,694 | B2 | 12/2004 | Goeking et al. | |
| 6,837,028 | B1 | 1/2005 | Miano et al. | |
| 6,840,353 | B2 | 1/2005 | Arisaka | |
| 6,840,420 | B1 * | 1/2005 | Hudson | 224/669 |
| 6,880,211 | B2 * | 4/2005 | Jackson et al. | 24/698.1 |
| 6,945,427 | B2 | 9/2005 | Hieb | |
| 6,972,033 | B2 | 12/2005 | McNicholas | |
| 6,976,348 | B1 | 12/2005 | Miano et al. | |
| 7,013,568 | B2 * | 3/2006 | Schmidt | 30/147 |
| 7,076,932 | B2 | 7/2006 | Rubin | |
| 7,090,455 | B2 | 8/2006 | Lamb | |
| 7,111,369 | B2 * | 9/2006 | Ho | 24/668 |
| D533,034 | S * | 12/2006 | Wasserman | D7/653 |
| D536,222 | S * | 2/2007 | Heiberg et al. | D7/645 |
| 7,210,279 | B1 | 5/2007 | Ahmed et a | |
| 7,322,172 | B2 | 1/2008 | Hoffman et al. | |
| 7,412,808 | B2 | 8/2008 | Lavi | |
| D591,104 | S | 4/2009 | Oakes | |
| 7,513,089 | B2 | 4/2009 | Rubin | |
| 7,516,831 | B2 | 4/2009 | Chang | |
| 7,520,247 | B2 | 4/2009 | Rutledge | |
| 7,669,256 | B2 * | 3/2010 | Harrow | 5/200.1 |
| 7,716,842 | B2 * | 5/2010 | Sumner-Trivisani et al. | 30/324 |
| 7,856,722 | B2 * | 12/2010 | Lago-Arenas | 30/147 |
| 8,070,013 | B2 | 12/2011 | Reinsel et al. | |
| 8,152,004 | B2 | 4/2012 | Smith et al. | |
| 8,272,533 | B1 | 9/2012 | D'Amelia et al. | |
| 8,296,957 | B2 * | 10/2012 | Muehlemann | 30/142 |
| 8,297,473 | B2 | 10/2012 | Smith | |
| 8,302,269 | B2 * | 11/2012 | Pitman | 24/591.1 |
| 8,360,273 | B2 | 1/2013 | Reinsel et al. | |
| 2002/0112445 | A1 | 8/2002 | Scaduto | |
| 2003/0015824 | A1 | 1/2003 | Forbes et al. | |
| 2003/0146061 | A1 | 8/2003 | Tournier | |
| 2004/0045398 | A1 | 3/2004 | Hayashi | |
| 2004/0045860 | A1 | 3/2004 | Edgerly et al. | |
| 2004/0089670 | A1 | 5/2004 | Goeking et al. | |
| 2005/0082307 | A1 | 4/2005 | Tucker | |
| 2005/0155186 | A1 * | 7/2005 | McGuyer et al. | 16/430 |
| 2005/0155229 | A1 * | 7/2005 | Lee | 30/322 |
| 2005/0252057 | A1 | 11/2005 | Lavi | |
| 2006/0000190 | A1 | 1/2006 | Behnke et al. | |
| 2006/0053638 | A1 | 3/2006 | Sumner-Trivisani et al. | |
| 2007/0006470 | A1 * | 1/2007 | Sumner-Trivisani et al. | 30/298.4 |
| 2007/0108141 | A1 | 5/2007 | Smith et al. | |
| 2007/0131705 | A1 | 6/2007 | Behravesh et al. | |
| 2007/0193968 | A1 | 8/2007 | Smith et al. | |
| 2007/0214650 | A1 * | 9/2007 | Tomazini | 30/142 |
| 2008/0121650 | A1 | 5/2008 | Smith | |
| 2008/0128445 | A1 | 6/2008 | Huang et al. | |
| 2009/0194557 | A1 | 8/2009 | Van Deursen | |
| 2010/0000096 | A1 * | 1/2010 | Muehlemann | 30/165 |
| 2010/0084418 | A1 | 4/2010 | Reinsel et al. | |
| 2010/0147869 | A1 | 6/2010 | Iliffe et al. | |
| 2010/0170915 | A1 | 7/2010 | Reinsel et al. | |
| 2011/0180562 | A1 | 7/2011 | Reinsel et al. | |
| 2011/0226797 | A1 | 9/2011 | Reinsel et al. | |
| 2011/0296693 | A1 * | 12/2011 | Oakes | 30/142 |
| 2012/0047744 | A1 * | 3/2012 | Walters | 30/142 |
| 2012/0080444 | A1 | 4/2012 | Smith et al. | |
| 2012/0110746 | A1 * | 5/2012 | Allard Serrano et al. | 7/151 |
| 2012/0145734 | A1 | 6/2012 | Walters | |
| 2012/0145735 | A1 | 6/2012 | Erickson et al. | |
| 2012/0145736 | A1 | 6/2012 | Walters et al. | |
| 2013/0032609 | A1 * | 2/2013 | Righetti et al. | 221/103 |
| 2013/0043272 | A1 * | 2/2013 | Oakes | 221/279 |
| 2013/0152406 | A1 * | 6/2013 | McFarland | 30/322 |

FOREIGN PATENT DOCUMENTS

| | | | |
|---|---|---|---|
| DE | 7033238 | U1 | 11/1970 |
| DE | 7127677 | U | 11/1971 |
| DE | 3151268 | | 7/1983 |
| DE | 4139938 | | 6/1993 |
| DE | 9316566 UI | | 1/1994 |
| DE | 19906369 | | 2/2000 |
| DE | 202005013647 | U1 | 7/2006 |
| EP | 0856272 | A2 | 1/1999 |
| EP | 1022107 | A1 | 7/2000 |
| EP | 1217923 | B1 | 9/2003 |
| EP | 1213985 | B1 | 6/2004 |
| EP | 1514497 | A1 | 3/2005 |
| EP | 1719438 | A1 | 11/2006 |
| EP | 1864596 | A2 | 12/2007 |
| FR | 2889507 | A1 | 2/2007 |
| WO | 01/05280 | A1 | 1/2001 |
| WO | 01/05281 | A1 | 1/2001 |
| WO | 01/68492 | A1 | 9/2001 |
| WO | 2004/028309 | A1 | 4/2004 |
| WO | 2007/049982 | A1 | 5/2007 |
| WO | 2007/012606 | A1 | 11/2007 |
| WO | 2008/058187 | A2 | 5/2008 |
| WO | 2009137367 | A2 | 11/2009 |

OTHER PUBLICATIONS

Peel Adhesion for Single Coated Pressure-Sensitive Tapes 180 Angle, Aug. 1989, pp. 21-22.
Tack Rolling Ball, Aug. 1989, pp. 29-30.
Holding Power of Pressure-Sensitive Tape, Aug. 1989, pp. 31-33.
European Patent Report 06009258.2, mailed Jul. 24, 2006, five pages, Munich, Germany.
International Search Report and Written Opinion for PCT/US07/83752, mailed Mar. 11, 2008, ten pages, European Patent Office, Munich, Germany.
Partial International Search Report for PCT/US2007/083922, mailed Jul. 8, 2008, two pages.
European Search Report for EP 08 014 387.8 mailed Nov. 11, 2008, two pages, European Patent Office, Munich, Germany.
International Search Report and Written Opinion for PCT/US2007/083922, mailed Nov. 17, 2008, 13 pages, European Patent Office, Rijswijk, Netherlands.
International Search Report and Written Opinion for PCT/US2009/059915, mailed Feb. 3, 2010, 13 pages, European Patent Office, Munich, Germany.
Office Actions for U.S. Appl. No. 11/556,808, filed Nov. 6, 2006.
Office Actions for U.S. Appl. No. 11/415,836, filed May 2, 2006.
Office Actions for U.S. Appl. No. 11/936,401, filed Nov. 7, 2007.
Office Action for U.S. Appl. No. 12/349,203, filed Jan. 6, 2009.
European Patent Office, Supplementary European Search Report for EP 11 79 3088 dated Sep. 25, 2013, 6 pages.

* cited by examiner

INTERLOCKING CUTLERY AND RELATED METHODS

CROSS-REFERENCE TO RELATED APPLICATION

This application claims priority to U.S. Provisional Patent Application No. 61/373,017 filed Aug. 12, 2010, the disclosure of which is incorporated herein in its entirety by this reference.

FIELD OF THE DISCLOSURE

The present disclosure relates to disposable cutlery. In particular, the present disclosure relates to utensils configured to be separably coupled to at least one other utensil

BACKGROUND

Disposable cutlery may be provided as a less expensive alternative to reusable cutlery, for example, at restaurants and social gatherings where it is undesirable or cost prohibitive to clean the cutlery for reuse. However, providing disposable cutlery may present a number of potential drawbacks related to the nature in which it is dispensed.

For example, providing disposable cutlery in a loose or unpackaged fashion, such as in loose form in a receptacle containing the disposable cutlery, may result in patrons taking more cutlery than necessary, thereby increasing the cost of providing the cutlery. In addition, providing loose or unpackaged cutlery may present concerns regarding whether dispensing cutlery in such a manner is hygienic. As a result, it may be desirable to dispense disposable cutlery in a manner other than in a loose or unpackaged form.

The above-noted concerns may be addressed by dispensing disposable cutlery from dispensers configured to contain a supply of the cutlery and dispense a disposable utensil upon operation of a patron. However, loading a quantity of unsecured or loose utensils into the dispenser may be a time consuming and tedious task, thereby potentially undermining the desirability of dispensing utensils via a dispenser.

In order to address this potential drawback, disposable cutlery may be provided in the form of bundles or cartridges containing a plurality of similar utensils. For example, disposable cutlery, such as spoons, forks, knives, and sporks, may be packaged such that a stack of like utensils are held together via a band, wrapper, tie, string, or other securing device. However, after such a device is removed from the utensils, it will usually be discarded as waste. Alternatively, or in addition, a stack of like utensils may be packaged in a cartridge configured to be placed within the dispenser, with the utensils being dispensed from the cartridge via the dispenser. However, similar to the securing devices, the cartridge will usually be discarded as waste after all of the utensils of the cartridge have been dispensed.

In addition, it may be desirable to provide utensils that are not prone to flipping or otherwise changing from a desired orientation during either a process of being loaded into a dispenser, or a process of being dispensed from a dispenser. For example, during dispensing of a stack of loose utensils, the utensils may have a tendency to flip or rotate within the dispenser as the stack slides within the dispenser, which may lead to jamming the dispenser, thereby potentially compromising the utility of the dispenser.

Additionally, it may be desirable to provide utensils in a form that are capable of being reliably dispensed from a dispenser one at a time. Utensils that are loosely received in a dispenser may have a tendency to dispense such that more than one utensil is unintentionally dispensed by a patron. This results in defeating one of the potential advantages of dispensing utensils via a dispenser—reducing costs associated with patrons taking more utensils than necessary.

It may also be desirable to provide a group of utensils that may be divided into smaller groups of utensils that are coupled to one another. In particular, utensils held together by a retaining device or cartridge may not be easily divided into smaller groups of utensils. This potential drawback may cause problems when, for example, only a few utensils remain in a dispenser, and it is anticipated that a large number of utensils will be dispensed. In such a situation, someone responsible for restocking the dispenser may need to wait for all of the utensils to be dispensed and risk having a delay between the time at which the dispenser is emptied and when it is reloaded with new utensils. Alternatively, they may need to load a portion of a group of utensils and either discard or store the remaining loose utensils.

Thus, it is desirable to provide a system and method for addressing one or more of the potential drawbacks discussed above.

SUMMARY

In the following description, certain aspects and embodiments will become evident. It should be understood that the aspects and embodiments, in their broadest sense, could be practiced without having one or more features of these aspects and embodiments. Thus, it should be understood that these aspects and embodiments are merely exemplary.

One aspect of the disclosure relates to a utensil that includes a functional end and a handle associated with the functional end. The handle includes a longitudinal axis, a first surface, and a second surface. The first surface includes at least one protrusion configured to separably couple the utensil to a second utensil. The second surface is configured to receive at least a portion of a third utensil. The at least one protrusion is configured such that the utensil and the second utensil are configured to be at least one of coupled and decoupled with respect to one another via relative movement in a plane parallel to a reference plane that intersects a plane extending between the first and second surfaces. According to some aspects, the first and second surfaces are interchangeable, such that, for example, the second surface may include at least one protrusion and the first surface may be configured to receive at least a portion of another utensil. As used herein, the term "parallel" includes substantially parallel, and the term "perpendicular" includes substantially perpendicular.

Another aspect of the disclosure relates to a method for separating a first utensil from a second utensil to which the first utensil is separably coupled. The first utensil includes a functional end and a handle associated with the functional end. The handle of the first utensil includes a longitudinal axis, a first surface, and a second surface, wherein the first surface includes at least one protrusion configured to separably couple the first utensil to the second utensil. The second utensil also includes a functional end and handle associated with the functional end. The handle of the second utensil includes a longitudinal axis, a first surface, and a second surface, the second surface of the second utensil being separably coupled to the first utensil via at least a portion of the at least one protrusion of the first utensil. The at least one protrusion of the first utensil and the second surface of the second utensil are configured such that the first utensil and the second utensil are configured to at least one of couple and decouple with respect to one another via relative movement in a plane parallel to a reference plane that intersects a plane extending between the first and second surfaces of the first utensil. The method further includes applying force to at least one of the first utensil and the second utensil, such that the first utensil and the second utensil are separated from one another.

BRIEF DESCRIPTION OF THE DRAWINGS

The accompanying drawings, which are incorporated in and constitute a part of this description, illustrate several exemplary embodiments and together with the description, serve to explain principles of the embodiments. In the drawings.

DESCRIPTION OF EXEMPLARY EMBODIMENTS

Figure 1A:
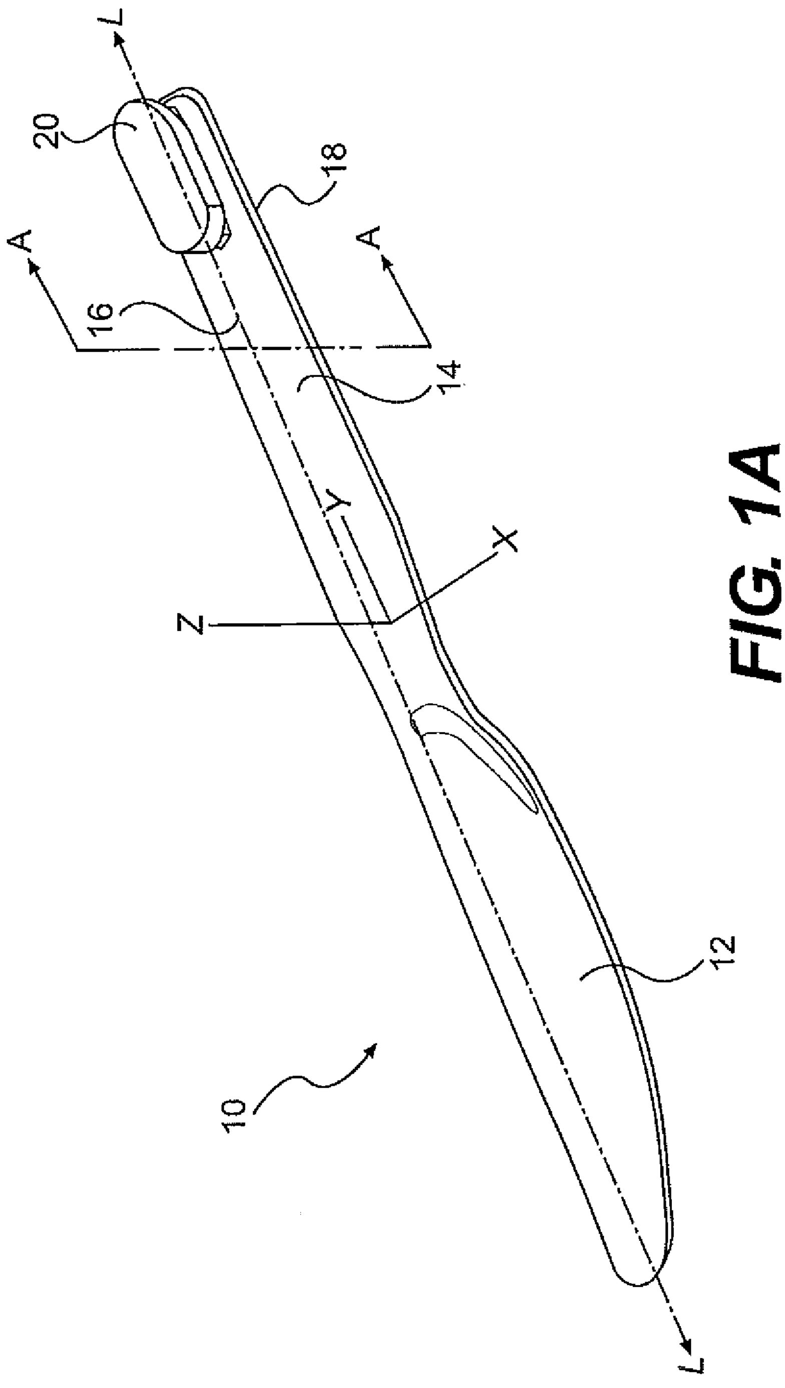
FIG. 1A is a schematic perspective view of an exemplary utensil.

Reference will now be made in detail to exemplary embodiments. Wherever possible, the same reference numbers are used in the drawings and the description to refer to the same or like parts.

FIG. 1A shows a schematic partial perspective view of an exemplary embodiment of a utensil 10. As shown in FIG. 1A, utensil 10 is a knife. However, utensil 10 may be any type of utensil, including, for example, a spoon, a fork, a knife, and a spork. In some embodiments, utensil 10 may be constructed from a formable material. The formable material may include, for example, plastic, combinations of plastics, or combinations of plastics and other materials suitable for use as disposable or reusable cutlery. For example, the formable material may include one or more of polystyrene, polyethylene, and polypropylene.

Exemplary utensil 10 has a functional end 12, which may be configured to be used to perform a function that assists in the consumption of food, for example, cutting, piercing, and/or scooping. Exemplary utensil 10 also includes a handle 14, which may be utilized by a user to hold and/or manipulate utensil 10. Utensil 10 may have a first surface 16 (e.g., an upper surface) and a second surface 18 (e.g., a lower surface). First surface 16 and second surface 18 may encompass a portion of handle 14, a portion of functional end 12, or a combination of both. In FIG. 1A, for example, first surface 16 includes at least a portion of handle 14.

In some embodiments, a protrusion 20 may be located on first surface 16 of utensil 10. While FIG. 1A shows a single protrusion 20, some embodiments have multiple protrusions 20 disposed on first surface 16. According to some embodiments, one or more protrusions 20 may be disposed on second surface 18. In some embodiments, protrusion 20 may be configured to separably couple a first utensil 10 and a second utensil 10 to one another. For example, a second utensil 10 may have a first surface 16 and a second surface 18 similar to a first utensil 10, where second surface 18 of second utensil 10 is configured to receive protrusion 20 of first utensil 10. Similarly, second surface 18 of first utensil 10 may be configured to receive a similar protrusion 20 of a third utensil 10.

According to some embodiments, utensil 10 includes a longitudinal axis L extending along at least a portion of the length of handle 14. In some embodiments, such as the exemplary embodiment shown in FIG. 1A, longitudinal axis L may be co-extensive with an axis Y. Also, in some embodiments, a reference plane R may intersect a plane P that extends between first surface 16 and second surface 18 of utensil 10. For example, plane P may be oriented such that it encompasses an axis X and an axis Z. Alternatively, plane P may be oriented such that it encompasses axis X and axis Y. In both examples, plane P would extend between first surface 16 and second surface 18. Plane P may be provided in any orientation that extends between first surface 16 and second surface 18, and need not encompass axis X, axis Y, or axis Z.

In some embodiments, reference plane R intersects plane P. Utensils 10 may be configured to separably couple and/or decouple with respect to one another via relative movement in a plane that is parallel to reference plane R.

Figure 1B:
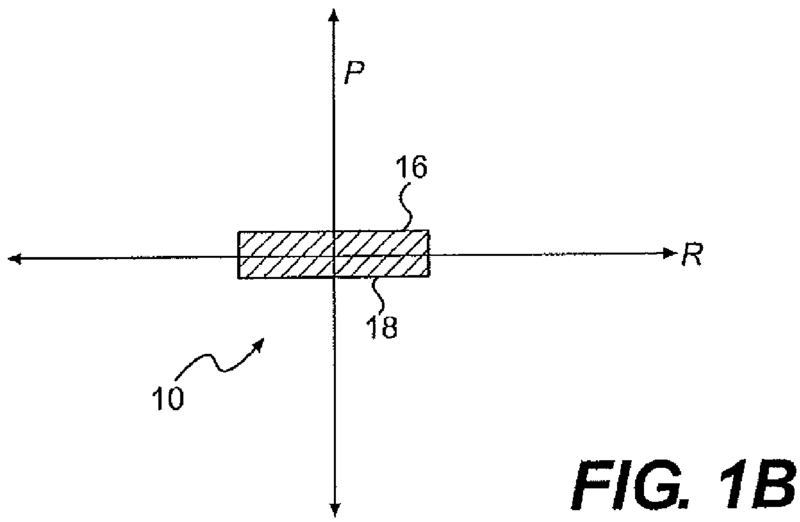
FIG. 1B is a schematic cross-sectional view of an exemplary handle of an exemplary utensil.
Figure 1C:
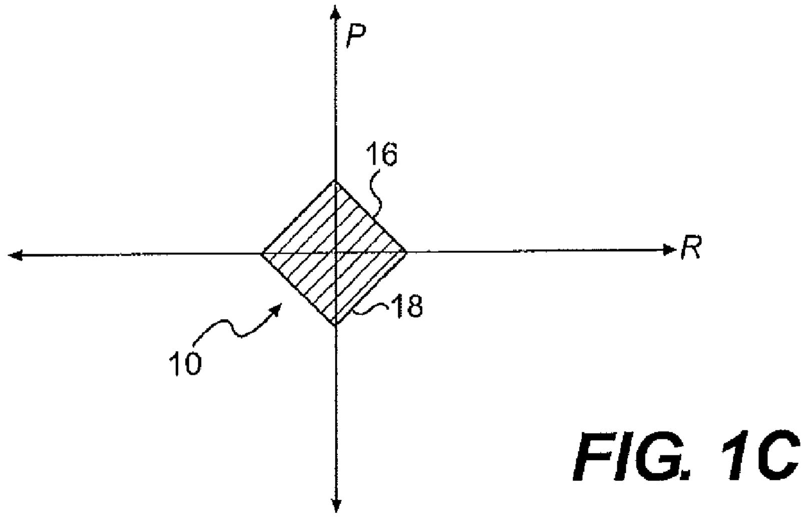
FIG. 1C is a schematic cross-sectional view of an exemplary handle of an exemplary utensil.
Figure 1D:
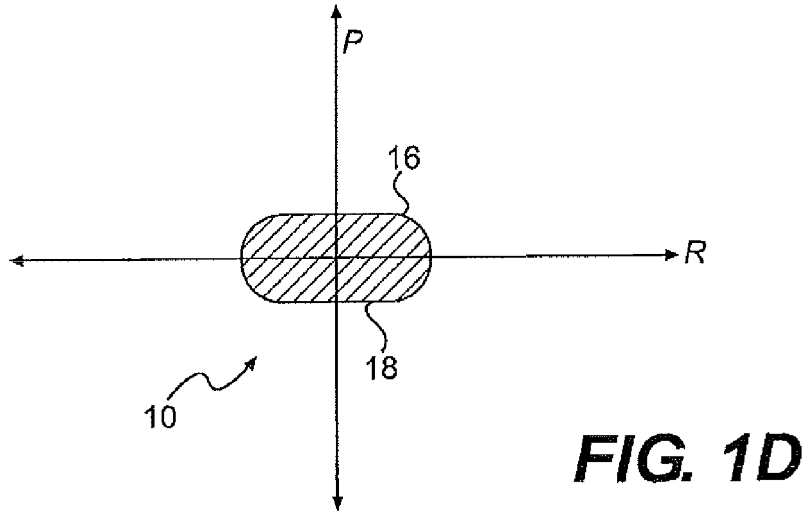
FIG. 1D is a schematic cross-sectional view of an exemplary handle of an exemplary utensil.

FIGS. 1B-1D show cross-sectional views, for example, along cross-sectional line A-A of FIG. 1A, of exemplary utensils 10. As shown in FIGS. 1B-1D, plane P is intersected by reference plane R. Reference plane R need not intersect utensil 10, however, and may be oriented such that it intersects plane P without also intersecting utensil 10. FIGS. 1B-1D show plane P oriented such that it encompasses axis Y and axis Z, but plane P may be provided in any other orientation that allows it to extend between the first surface 16 and second surface 18 of utensil 10. According to some embodiments, reference plane R and plane P are perpendicular with respect to one another, for example, as shown in FIGS. 1B-1D.

First surface 16 and second surface 18 may be provided in different orientations. For example, FIG. 1B shows a utensil 10 having a substantially rectangular-shaped cross-section, with first surface 16 and second surface 18 opposite and parallel to one another. FIG. 1C, on the other hand, shows a utensil 10 having a square-shaped cross-section, with first surface 16 and second surface 18 provided in a non-parallel orientation. As shown in FIG. 1D, utensil 10 may have an oval or rounded cross-sectional shape, where first surface 16 and second surface 18 comprise surfaces that are curved. In all of these examples, plane P extends between the first surface 16 and second surface 18, and reference plane R intersects plane P. According to some embodiments, utensils 10 may couple and/or decouple with respect to one another via relative movement in a plane parallel to reference plane R.

Figure 2A:
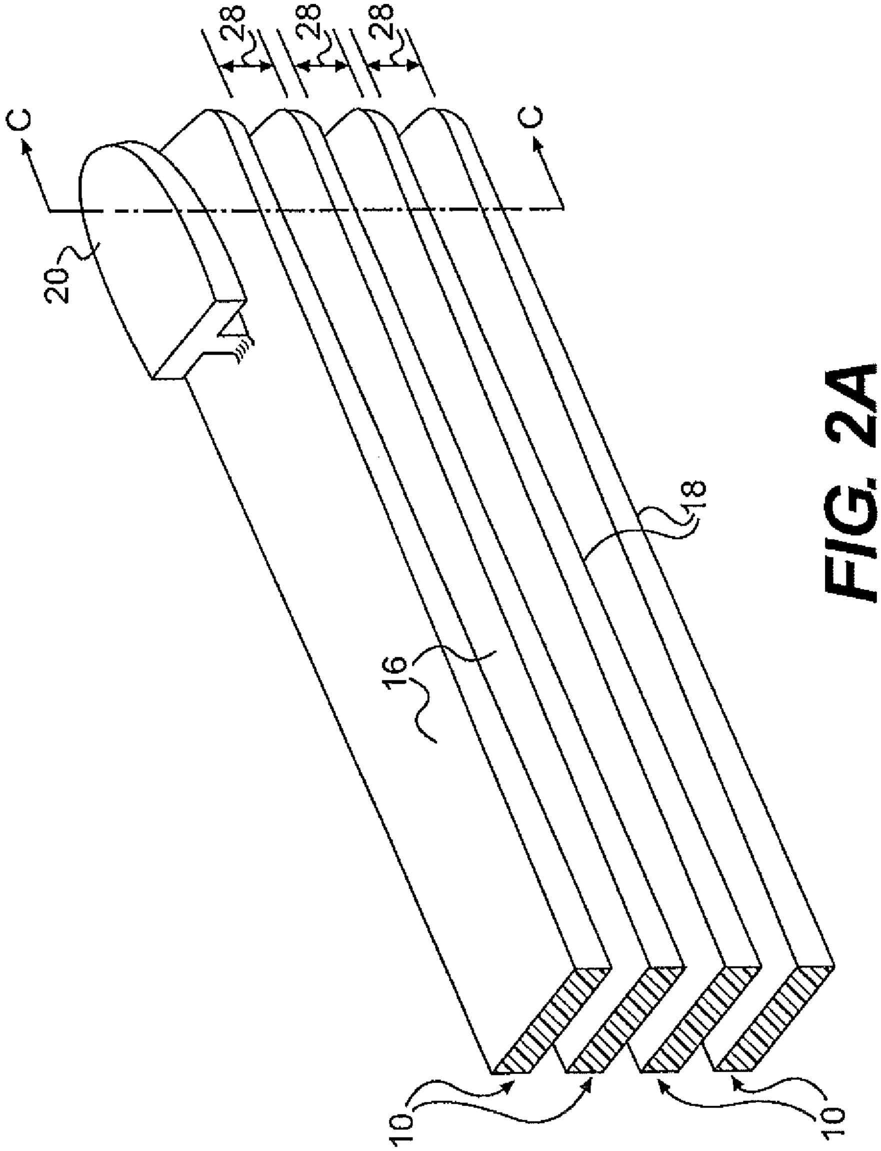
FIG. 2A is a schematic partial perspective view of a plurality of coupled exemplary utensils.

A plurality of exemplary utensils 10 may be coupled to one another, forming a stack or module of coupled utensils 10, for example, as shown in FIG. 2A. Although FIG. 2A shows four utensils 10, any number of utensils may be coupled to one another, such as, for example, 10, 15, 25, 50, 100, or more utensils 10. According to some embodiments, protrusion 20 and second surface 18 of each utensil 10 of a stack may be configured such that when utensils 10 are coupled, a distance 28 is provided between adjacent utensils 10. The distance 28 between utensils 10 may vary, and in some embodiments, distance 28 may be small enough that first surface 16 of one utensil 10 is in contact with second surface 18 of an adjacent utensil 10 (see, e.g., FIG. 4). In some embodiments, distance 28 may be measured as the distance between the first surface 16 of one utensil 10 and the second surface 18 of an adjacent, coupled utensil 10.

Figure 2B:
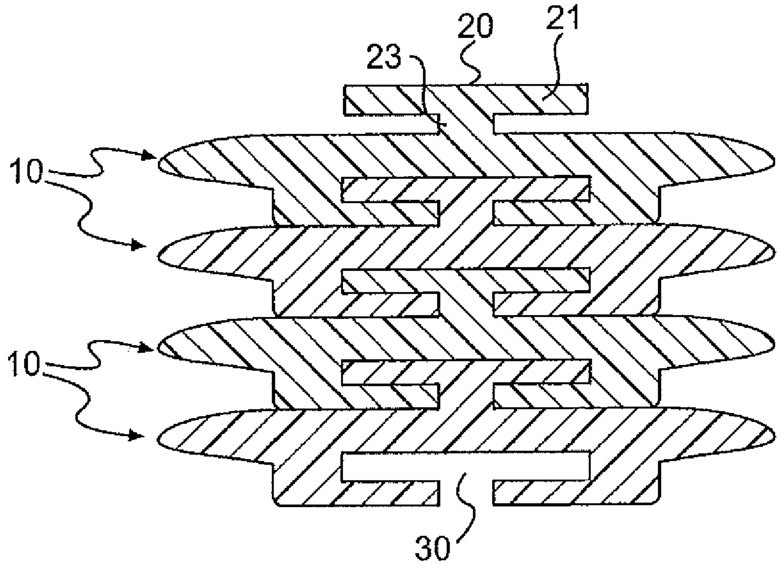
FIG. 2B is a schematic cross-sectional view along line C-C of FIG. 2A.

FIG. 2B shows a cross-sectional view along line C-C of FIG. 2A. In some embodiments, the utensils 10 may have second surfaces 18 that include at least one channel 30 shaped to receive protrusion 20. For example, channel 30 may be configured to control various aspects of the fit between two utensils 10. For example, if channel 30 is almost equal to, but only slightly wider than, protrusion 20, then the fit may be relatively tight, making it relatively more difficult to couple and/or decouple the utensils 10. Alternatively, if channel 30 is significantly wider than protrusion 20, the fit may be less tight, making coupling and/or decoupling easier.

Figure 2C:
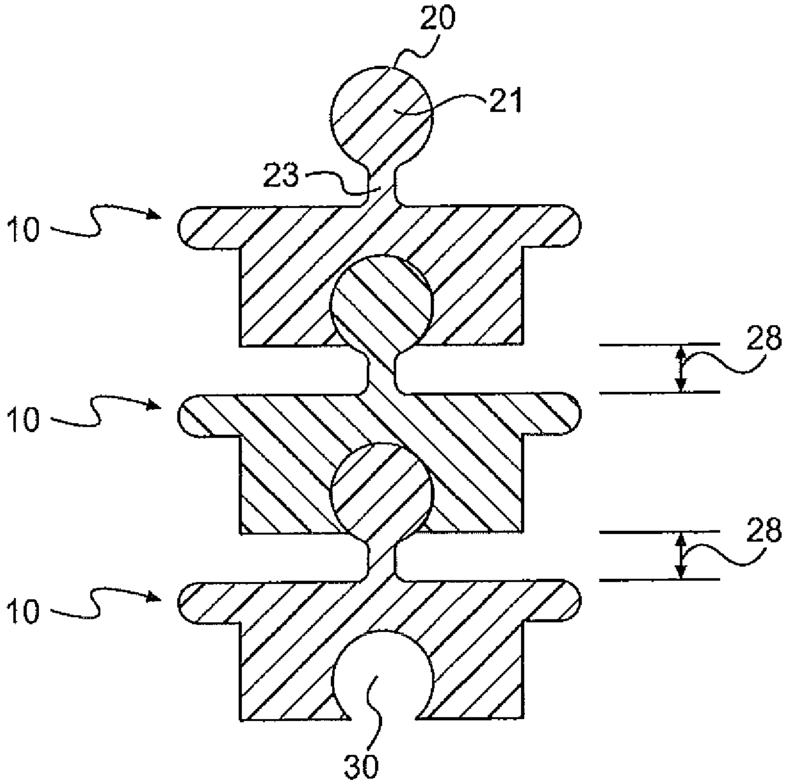
FIG. 2C is a schematic cross-sectional view, similar to FIG. 2B, of a plurality of coupled utensils according to an exemplary embodiment.
Figure 2D:
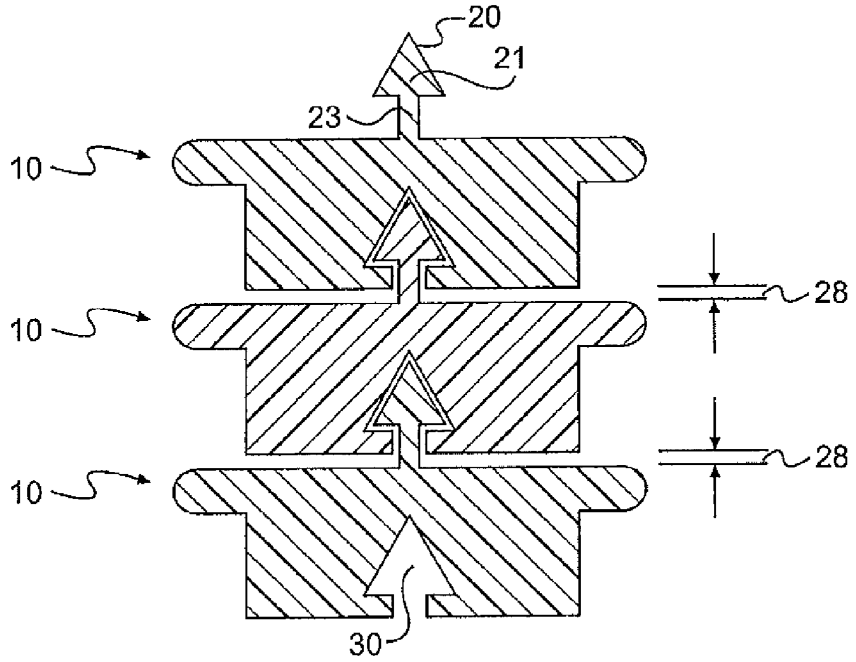
FIG. 2D is a schematic cross-sectional view, similar to FIG. 2B, of a plurality of coupled utensils according to another exemplary embodiment.
Figure 2E:
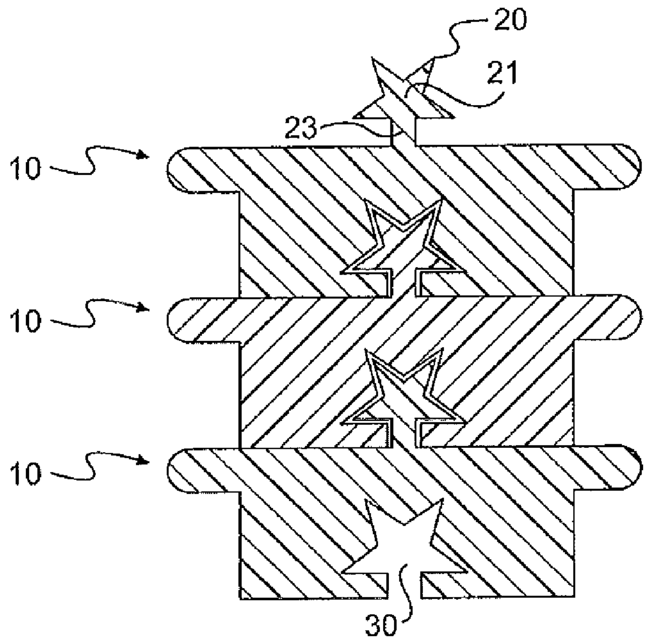
FIG. 2E is a schematic cross-sectional view, similar to FIG. 2B, of a plurality of coupled utensils according to a further exemplary embodiment.

In some embodiments, protrusion 20 may include a head portion 21 and a neck portion 23. FIG. 2B, for example, shows protrusions 20 having rectangular head portions 21 and neck portions 23 that are narrower than head portions 21. Head portions 21 and neck portions 23 may have various sizes and/or shapes. For example, as shown in FIG. 2C, the cross section of protrusion 20 may have a round head portion 21 with a narrower neck portion 23. As shown in FIG. 2D, for example, the cross section of protrusion 20 may have a triangular head portion 21 with a narrower neck portion 23. As FIG. 2E shows, the cross section of protrusion 20 may have a pointed- or star-shaped head portion 21 with a narrower neck portion 23. Head portion 21 is not limited to these shapes, however, and may be configured in any size, shape, and/or number that allows for separable coupling with another utensil 10. Utensils 10 may couple to one another more reliably when, for example, the cross-section of head portion 21 is wider than or equal to the cross-section of neck portion 23.

According to some embodiments, channel 30 may be shaped in any manner that allows at least two utensils 10 to separably couple to one another. For example, the channel 30 shown in FIG. 2B is shaped in a rectangular manner and receives the rectangular-shaped head portion 21 of protrusion 20. Similarly, the channels 30 shown in FIGS. 2C-2E are configured according to the shape of the protrusion 20 that channel 30 is configured to receive. However, channel 30 need not be shaped according to the shape of the protrusion 20 that it is receiving. For example, a channel 30 with a triangular cross-sectional shape may still receive a protrusion 20 having a rectangular cross-sectional shape, depending on the dimensions of protrusion 20 and channel 30.

In some embodiments, at least one protrusion 20 may perform a spacing function as well as a coupling function. For example, the size, shape, and/or orientation of protrusions 20 may influence the distance 28 between utensils 10. Similarly, in some embodiments, the size, shape, and/or orientation of second surface 18 or channel 30 may influence the distance 28 between utensils 10. According to some embodiments, for example, the neck portion 23 of a protrusion 20 may be extended such that a particular distance 28 is provided between utensils 10. Similarly, the size and/or shape of the head portion 21 of the protrusion 20 may be configured to increase or decrease the distance 28 between utensils 10. Maintaining the distance 28 between utensils 10 may assist in coupling, decoupling, and/or dispensing of utensils 10. Additionally, providing distance 28 between utensils 10 may assist in loading and/or handling a plurality of coupled utensils 10 by allowing for some amount of flexibility, play, and/or relative movement of the coupled utensils 10. The distance 28 between utensils 10 may also allow certain utensil dispensers to more reliably dispense the utensils 10.

Figure 3A:
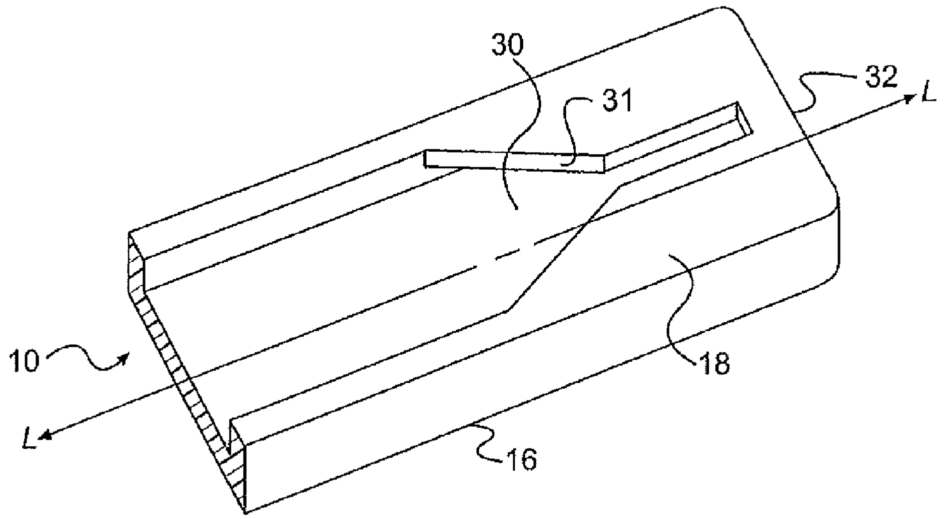
FIG. 3A is a schematic partial perspective view of an exemplary channel of an exemplary utensil.

Referring to FIG. 3A, it shows a schematic perspective view of an exemplary second surface 18 shaped to receive at least one protrusion 20. For example, second surface 18 may include a channel 30 that extends along a portion, or all, of the second surface 18. An opening 31 of channel 30 may vary in width to assist in separably coupling utensils 10 to one another. For example, in some embodiments, including the one shown in FIG. 3A, opening 31 of channel 30 may be configured to narrow toward a handle end 32 of utensil 10. A wider portion of opening 31 may allow protrusion 20 to nest within channel 30, while the narrower portion of opening 31 may retain protrusion 20 once it has been partially or fully inserted into channel 30. For example, protrusion 20 may separably couple or interlock with a second utensil 10 when protrusion 20 is inserted into channel 30.

In some embodiments, utensil 10 may couple with a second utensil 10 via relative movement in a plane parallel to reference plane R. For example, referring to FIG. 3A, protrusion 10 may be first inserted into the wide portion of opening 31 of channel 30. In order to couple the utensils, protrusion 10 may be moved in a plane parallel to reference plane R, such that neck portion 23 of protrusion 20 enters the narrow portion of opening 31 of channel 30 and separably couples the two utensils to one another. In some embodiments, protrusion 10 may be moved, for example, along an axis parallel to the longitudinal axis L (e.g., parallel to axis Y).

Figure 3B:
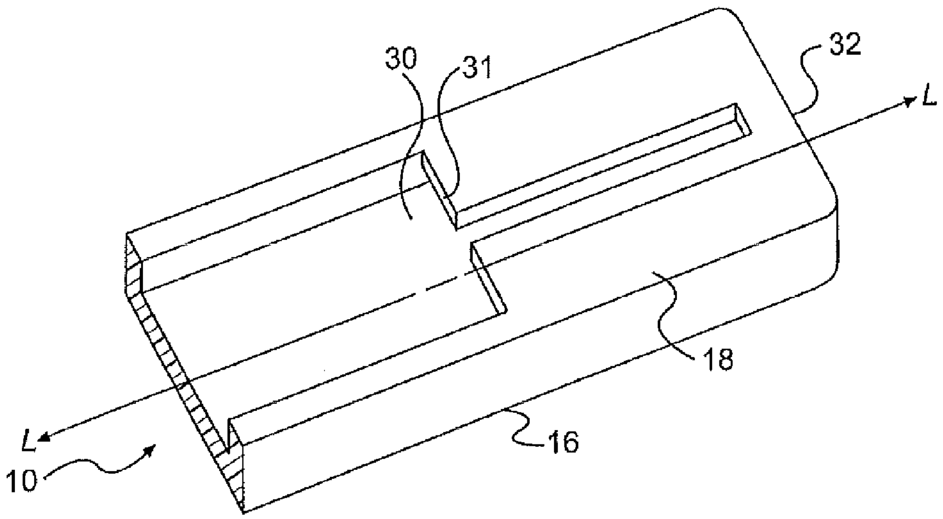
FIG. 3B is a schematic partial perspective view of an exemplary channel of another exemplary utensil.

FIG. 3B shows a schematic perspective view of exemplary second surface 18 including an exemplary channel 30 having an opening 31 that differs from the opening 31 shown in FIG. 3A. Channel 30 may be configured such that a portion of opening 31 of channel 30 narrows in a step-wise manner towards handle end 32 of utensil 10. The wider portion of opening 31 of channel 30 may allow for head portion 21 of protrusion 20 to nest within channel 30, while the narrower portion of opening 31 of channel 30 may retain head portion 21 of protrusion 20 once it has been partially or fully inserted into the channel 30. Similar to the embodiment shown in FIG. 3A, the utensil 10 shown in FIG. 3B may also be configured to couple with a second utensil 10 via relative movement in a plane parallel to the reference plane R.

Figure 3C:
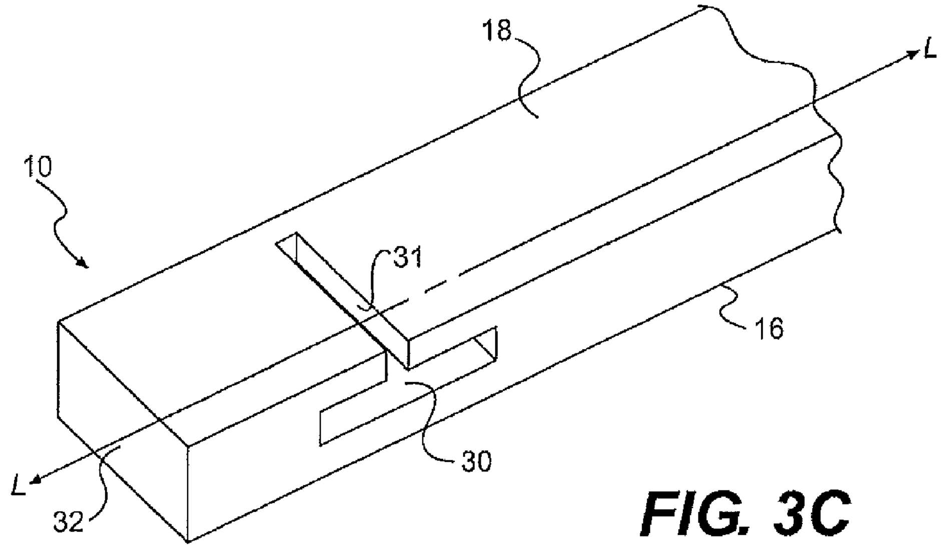
FIG. 3C is a schematic partial perspective view of an exemplary channel of a further exemplary utensil.

According to some embodiments, the utensils 10 may be coupled and/or decoupled via relative movement along other axes that are in a plane parallel to the reference plane R. Referring to FIG. 3C, for example, it shows a schematic perspective view of the second surface 18 of exemplary utensil 10 configured to receive protrusion 20 from a direction parallel to the reference plane R, but transverse to longitudinal axis L of handle 14. For example, the utensil 10 shown in FIG. 3C may receive protrusion 20 along an axis substantially perpendicular to the longitudinal axis L. In some embodiments, protrusion 20 may couple and/or decouple with utensil 10 by being inserted into channel 30 and then sliding in a direction substantially perpendicular to the longitudinal axis L, until neck portion 23 of protrusion 20 partially or fully enters the narrow region of opening 31 of channel 30, thereby coupling with the second utensil 10.

Figure 3D:
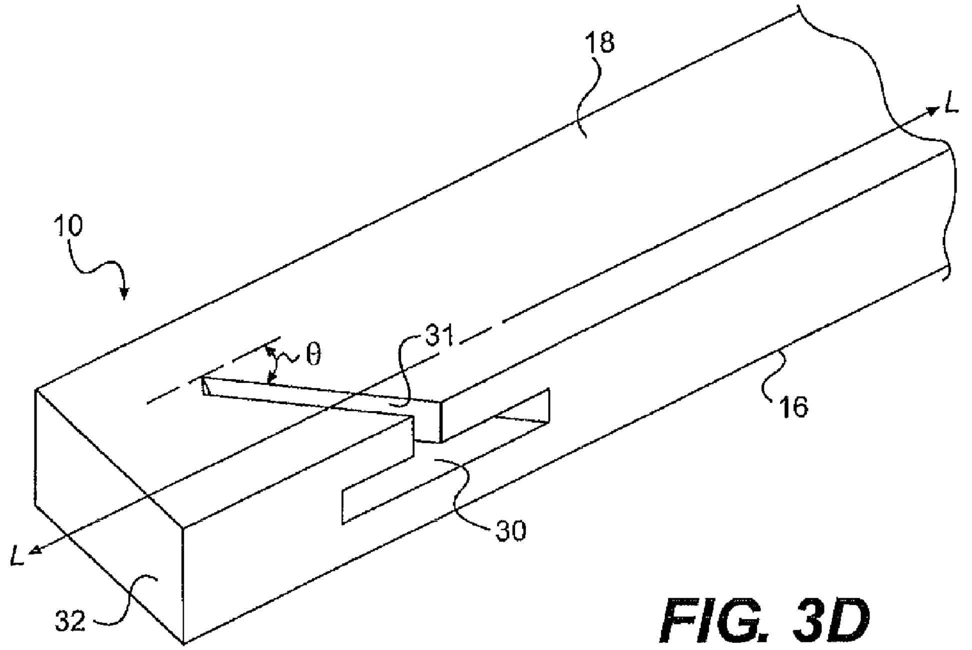
FIG. 3D is a schematic partial perspective view of an exemplary channel of another exemplary utensil.

FIG. 3D shows an exemplary utensil 10 configured to receive protrusion 20 in a direction that is parallel to reference plane R and transverse to longitudinal axis L, but which is neither parallel nor perpendicular to the longitudinal axis L. According to some embodiments, the transverse direction is not limited to a parallel or perpendicular direction, and may instead encompass any other direction. For example, utensil 10 may receive a protrusion 20 in a direction that is parallel to the reference plane R but aligned at an angle θ, for example, 30, 45, or 60 degrees, with respect to longitudinal axis L. Such an angle may facilitate coupling and/or decoupling one such utensil 10 from another, for example, by rotating handle 14 of one utensil 10 relative to the handle 14 of another utensil 10.

Also, in some embodiments, utensil 10 may have more than one channel 30 configured to receive respective protrusions 20. For example, handle 14 may have two, three, or more channels 30 oriented along axes that are substantially parallel to axis X. Handle 14 may also have at least one channel 30 oriented such that, relative to the other channels 30, it is oriented along a different axis that is still parallel to reference plane R. For example, the channels 30 of FIGS. 3C and 3D may both be incorporated into a single utensil 10.

Figure 3E:
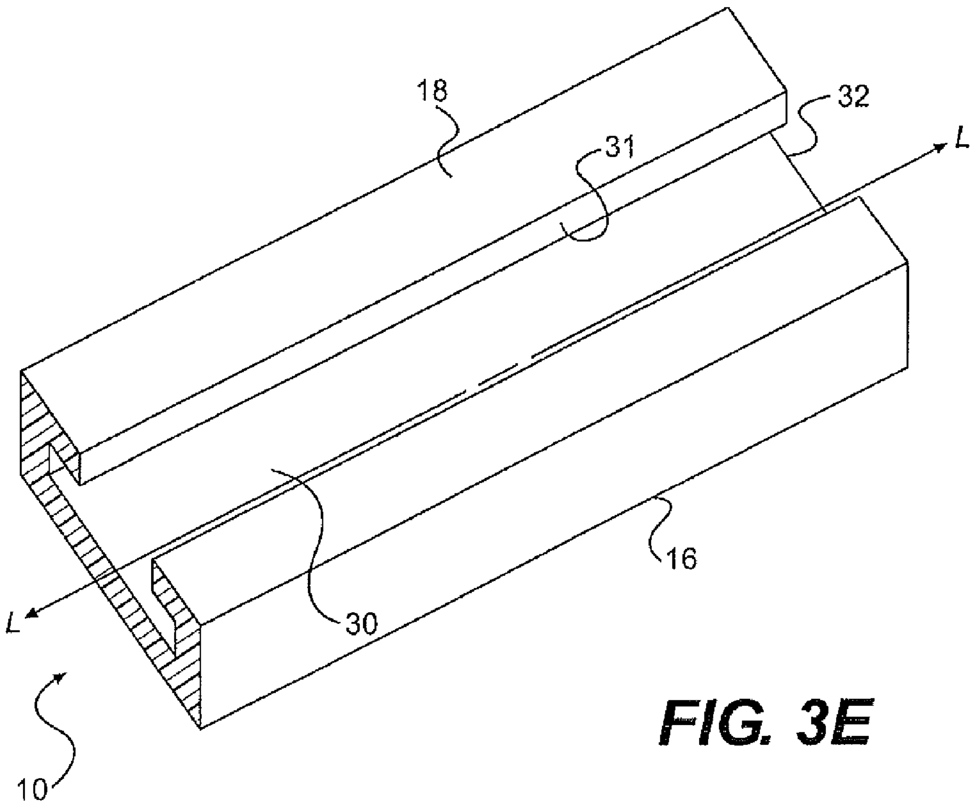
FIG. 3E is a schematic partial perspective view of an exemplary channel of a further exemplary utensil.

FIG. 3E shows an exemplary channel 30 extending substantially the length of handle 14, for example, to handle end 32 of utensil 10. In some embodiments, the protrusion 20 may be shaped such that it may move, via relative movement along a direction parallel to the reference plane R, at least partially within the channel 30 of second surface 18.

Figure 4:
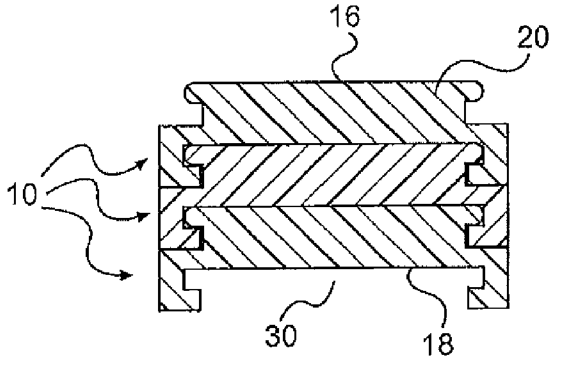
FIG. 4 is a schematic cross-sectional view of a plurality of exemplary utensils coupled to one another.

According to some embodiments, such as the embodiment shown in FIG. 4, protrusion 20 and channel 30 may be configured such that there is little or no space between first surface 16 and second surface 18 upon coupling of two utensils 10. For example, FIG. 4 shows a schematic cross-sectional view of a plurality of exemplary utensils 10 coupled to one another via first surface 16 and second surface 18, such that a first surface 16 of a first utensil 10 abuts a second surface 18 of an adjacent utensil 10 of a stack of coupled utensils 10. The utensils 10 shown in FIG. 4 may be configured such that the first surface 16 of utensil 10 is capable of coupling and/or decoupling with the second surface 18 of a second utensil 10 via relative movement in a plane parallel to reference plane R.

Figure 5A:
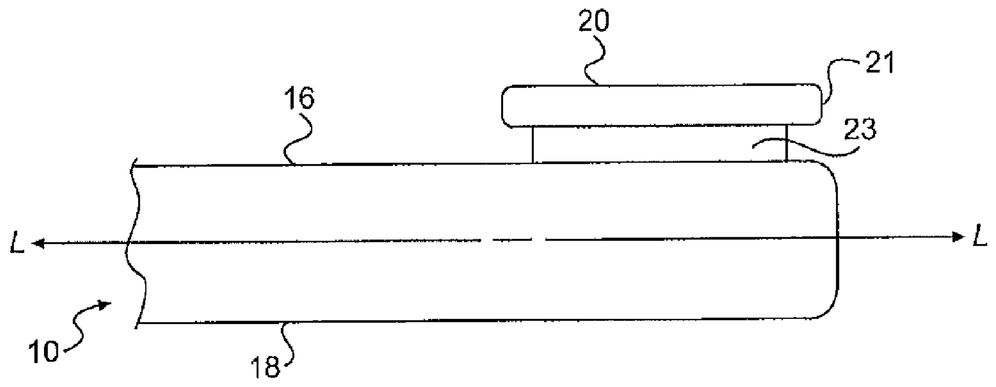
FIG. 5A is a schematic partial side view of an exemplary protrusion.
Figure 5B:
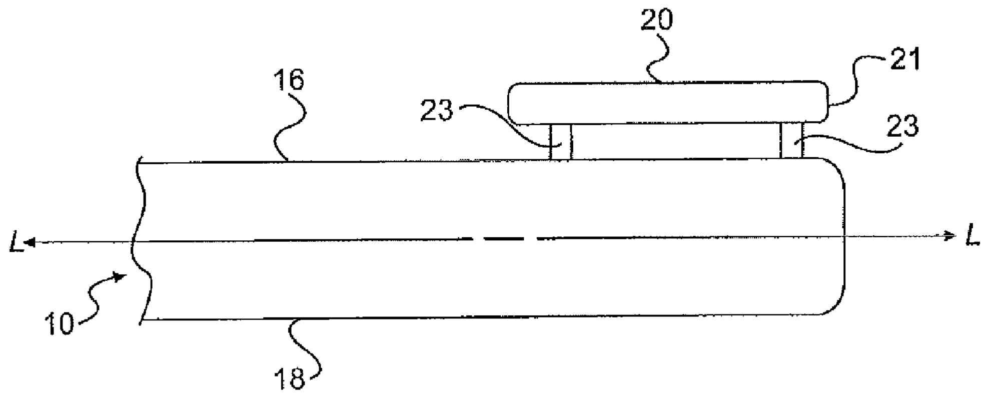
FIG. 5B is a schematic partial side view of another exemplary protrusion.

According to some embodiments, neck portion 23 may extend the entire length of head portion 21, for example, as shown in FIG. 2A. According to other embodiments, neck portion 23 may extend only a portion of the length of head portion 21, for example, as shown in FIGS. 5A and 5B. The length of the neck portion 23 relative to the head portion 21 may influence the ability of utensils 10 to couple and/or decouple with one another. For example, if the length of neck portion 21 is increased, it may result in protrusion 20 being more rigid, which may influence coupling and/or decoupling. On the other hand, a shorter neck portion 23 may cause protrusion 20 to be less rigid, which may influence coupling and/or decoupling in other ways. For example, a shorter neck portion 23 may decrease the force necessary to separate utensils from one another.

FIGS. 5A and 5B show schematic side views of exemplary utensils 10 with exemplary protrusions 20 provided on first surface 16. Referring to FIG. 5A, exemplary protrusion 20 includes head portion 21 and neck portion 23, where neck portion 23 extends slightly short of the entire length of head portion 21. According to some embodiments, neck portion 23 of protrusion 20 may be provided as a plurality of neck portions 23. For example, FIG. 5B shows a schematic side view of an exemplary utensil 10 with an exemplary protrusion 20 that includes head portion 21 and a plurality of neck portions 23. Multiple neck portions 23 may be provided to obtain desired characteristics. For example, multiple neck portions 23 may provide a desired level of stiffness to protrusion 20, while also potentially reducing the amount of material used to form neck portion 23. While two neck portions 23 are shown in FIG. 5B, any number of neck portions 23 may be used.

Figure 5C:
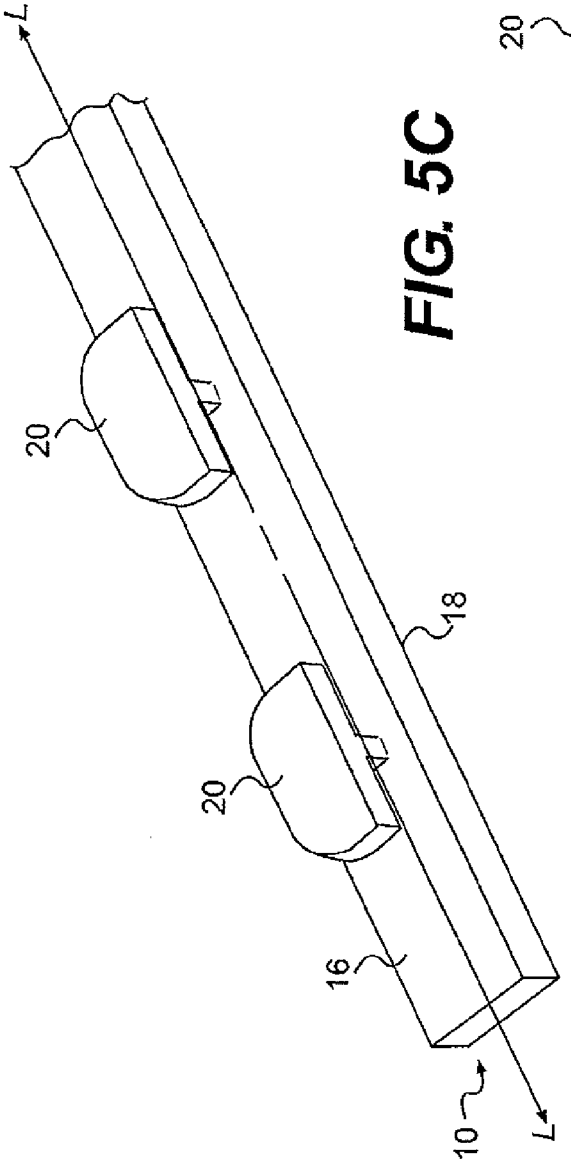
FIG. 5C is a schematic partial perspective view of an exemplary embodiment of a utensil.

FIG. 5C shows an exemplary utensil 10 having two exemplary protrusions 20 configured to couple with two channels 30 that are disposed, for example, along axes substantially parallel to axis X (e.g., two channels 30 similar to channel 30 shown in FIG. 3C). In some embodiments, more than two protrusions 20 may be provided on a utensil. The protrusions 20 may be oriented in any direction. While FIG. 5C discloses exemplary protrusions 20 that may couple via movement in a direction substantially parallel to axis X, the protrusions 20 may be oriented such that they couple via movement in other directions parallel to reference plane R (e.g., parallel to axis Y, or at an angle in between axis X and axis Y, for example, as shown in FIG. 3D). In some embodiments that include multiple protrusions 20, the various protrusions 20 may be provided in a variety of different shapes, sizes, and/or orientations.

Figure 6:
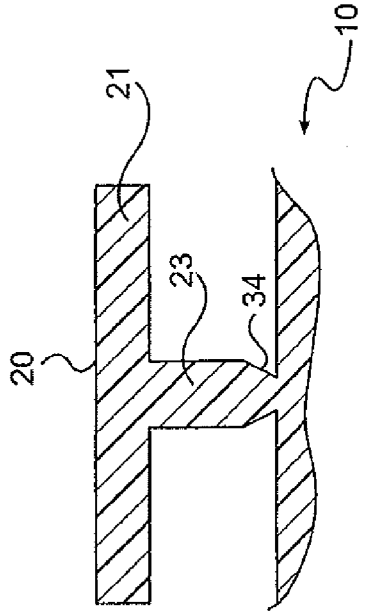
FIG. 6 is a schematic cross-sectional view of an exemplary embodiment of a protrusion.

FIG. 6 shows a schematic cross-sectional view of an exemplary protrusion 20 having a rectangular head portion 21, a neck portion 23, and a connection portion 34. In the exemplary embodiment shown in FIG. 6, connection portion 34 may narrow relative to the remainder of neck portion 23. Although connection portion 34 is shown at a location where neck portion 23 contacts utensil 10, it may be provided at any location along neck portion 23. For example, connection portion 34 may be provided at a location where neck portion 23 meets head portion 21 of protrusion 20. Depending on the location of connection portion 34, some or all of protrusion 20 may separate from utensil 10. For example, if connection portion 34 is located at the base of neck portion 23, then the entire protrusion 20 may detach from utensil 10. On the other hand, for example, if connection portion 34 is located at a position other than the base of neck portion 23, then a portion of protrusion 20 may detach from utensil 10 while leaving a portion of neck portion 23 attached to utensil 10.

According to some embodiments, connection portion 34 may be provided in a size and/or orientation that facilitates separation of protrusion 20 from utensil 10, for example, upon dispensing. Providing a narrow connection portion 34 may decrease the amount of force used to separate protrusion 20 from utensil 10. In some embodiments, connection portion 34 may be wider than the remainder of neck portion 23 where, for example, protrusion 20 is intended to remain coupled to utensil 10 during decoupling and/or dispensing.

Figure 7A:
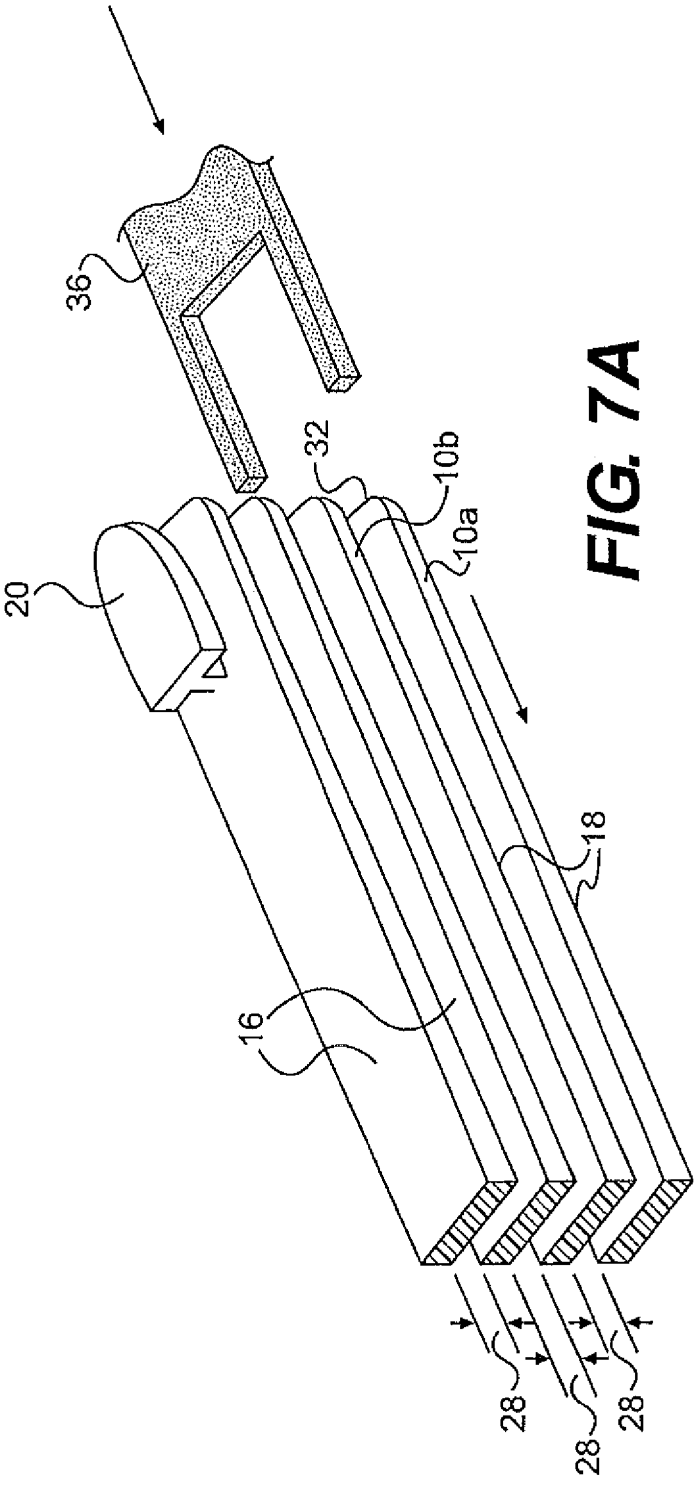
FIG. 7A is a schematic partial perspective view of an exemplary decoupler for decoupling an exemplary utensil from a plurality of coupled utensils.
Figure 7B:
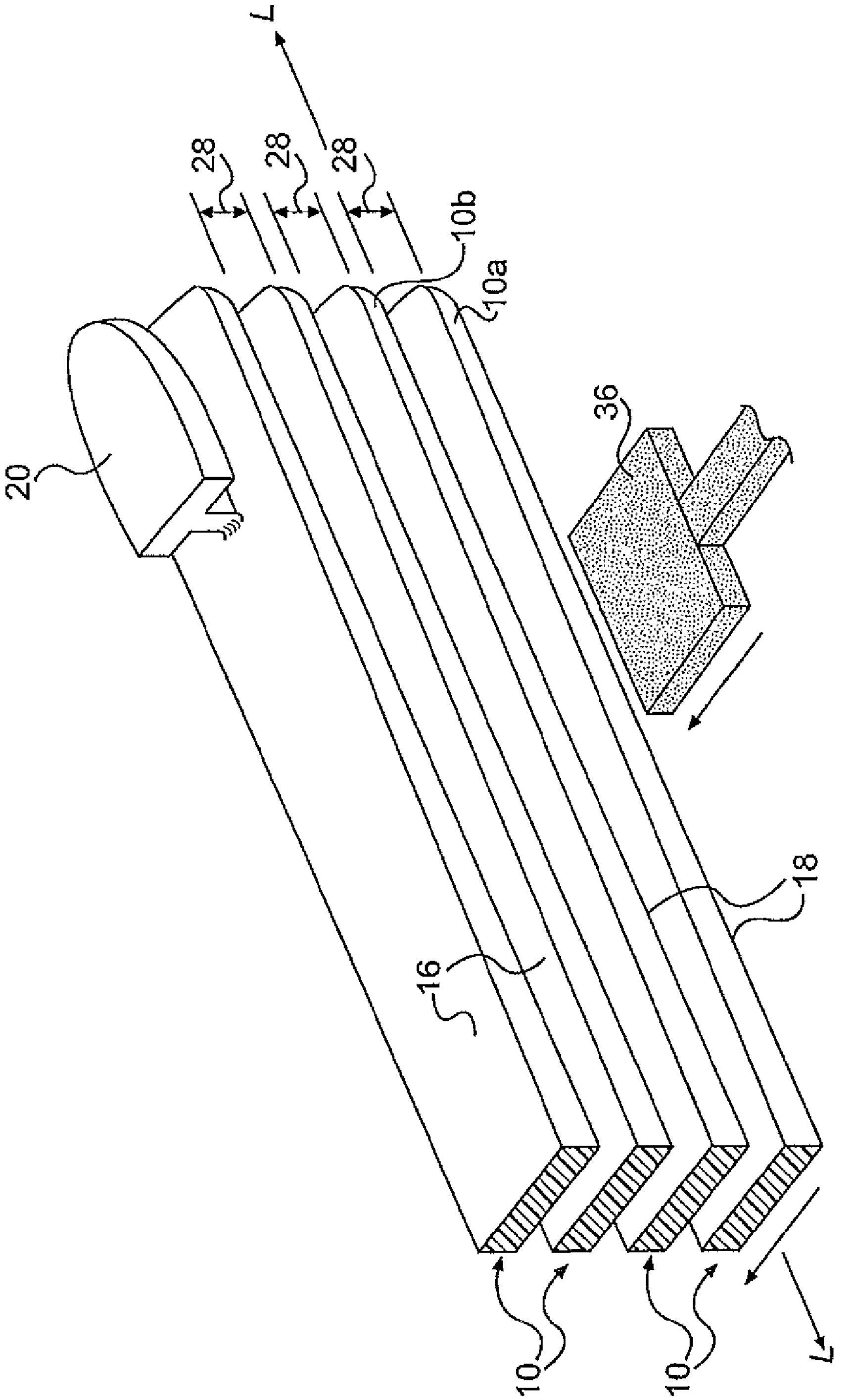
FIG. 7B is a schematic partial perspective view of another exemplary decoupler for decoupling an exemplary utensil from a plurality of coupled utensils.
Figure 7C:
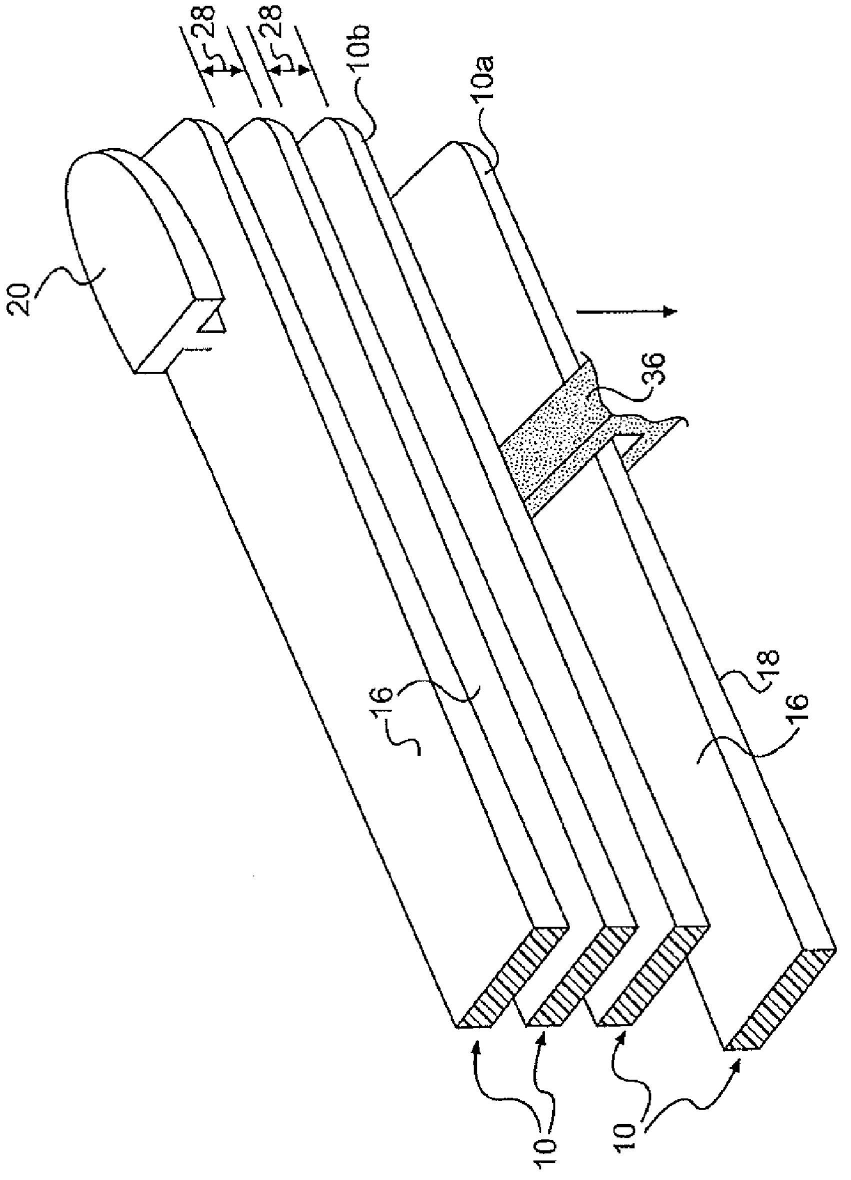
FIG. 7C is a schematic partial perspective view of a further exemplary decoupler for decoupling an exemplary utensil from a plurality of coupled utensils.

FIGS. 7A-7C show schematic perspective views of exemplary stacks of coupled utensils 10 undergoing an exemplary decoupling and/or dispensing process. In FIG. 7A, for example, exemplary decoupler 36 is shown approaching utensil 10*a* at the bottom of the stack of coupled utensils 10. In some embodiments, the decoupler 36 may apply force to utensil 10*a*, for example, at the handle end 32 of utensil 10*a*, such that utensil 10*a* is decoupled from an adjacent utensil 10*b* from the stack. For example, as shown in FIG. 7A, exemplary decoupler 36 may apply force in a direction substantially parallel to axis Y (see FIG. 1A). As shown in FIG. 7B, on the other hand, exemplary decoupler 36 is shown in an orientation that may allow it to apply force in a direction transverse to the longitudinal axis L. As shown in FIG. 7C, exemplary decoupler 36 is shown in an orientation that may allow it to apply force in a direction substantially parallel to axis Z. It is contemplated that decoupling force may be applied to any number of utensils 10 in any number of directions. According to some embodiments, a plurality of decouplers 36 may be used individually, or in combination, to decouple utensils 10 from one another.

According to some embodiments, such as those disclosed in FIGS. 7A and 7B, decoupler 36 may apply force to a portion of utensil 10 other than first surface 16 or second surface 18. In FIG. 7C, however, exemplary decoupler 36 may apply a force in a direction substantially parallel to axis Z that acts on first surface 16 of the utensil 10 to be decoupled. Such decoupler 36 may have a claw- or clamp-shaped head, such that it abuts both first surface 16 and second surface 18. Alternatively, such decoupler 36 may include a generally wedge-shaped head configured to be inserted between two utensils 10. For example, the size and/or shape of the head of decoupler 36 may force the utensils 10 on either side of the head in opposite directions, thereby separating protrusion 20 from the utensil 10 to be decoupled. According to some embodiments, the head of decoupler 36 may be configured to apply pressure to neck portion 23 of protrusion 20 directly, thereby severing neck portion 23. In some embodiments, utensils 10 may be configured such that the distance 28 between utensils 10 facilitates insertion of a decoupler 36 between two utensils 10, such that a force may be applied in a direction, for example, substantially parallel to the axis Z. Decoupler 36 may include at least one gear configured to assist in decoupling utensil 10. For example, the rotation of at least one gear may dictate the speed and direction of the movement of decoupler 36. In some embodiments, gear teeth may directly engage one or more utensils 10 and decouple a utensil 10 from a stack of utensils.

In some embodiments, protrusion 20 of a utensil 10 that is being decoupled may move out of the narrower portion of opening 31 in channel 30 and, upon entering a wide area of opening 31, decouple from a second utensil 10. Alternatively, the protrusion 20 may slide out of channel 30 entirely in order to decouple from another utensil 10, for example, when channel 30 extends to handle end 32, as shown in FIG. 3E. Protrusion 20 need not slide out of channel 30, however. For example, decoupler 36 may apply force sufficient to separate protrusion 20 from first surface 16 of utensil 10, thereby decoupling at least one utensil 10. According to some embodiments, it may be intended that protrusion 20, once separated from its corresponding utensil 10, remain in channel 30 of the utensil from which the first utensil has been decoupled. According to some embodiments, it may be intended that protrusion 20 separate from both the first utensil 10 to which it was previously coupled, as well as the second utensil 10 to which the first utensil 10 was previously coupled. In such case, the detached protrusions 20 may be collected in a portion of a dispenser from which the utensils 10 are being dispensed, for example, for discard or recycling purposes.

According to some embodiments, the decoupler 36 may be part of a dispenser (not shown) for dispensing individual utensils 10. Such a dispenser may utilize a decoupler 36 to decouple utensils 10 one or more at a time. The dispenser may also hold one or more types of utensils 10, including, for example, at least one of a spoon, a fork, a knife, and/or a spork.

It will be apparent to those skilled in the art that various modifications and variations can be made to the structures and methodologies described herein. Thus, it should be understood that the invention is not limited to the subject matter discussed in the description. Rather, the present disclosure is intended to cover modifications and variations.

What is claimed is:

1. A cutlery utensil comprising:

a functional end; and a handle associated with the functional end, the handle having a longitudinal axis, wherein the handle comprises a first surface, an opposite second surface, a protrusion disposed on the first surface and configured to separably couple the cutlery utensil and a second cutlery utensil, and a channel defined in the second surface and configured to separably couple the cutlery utensil and a third cutlery utensil;

wherein the protrusion comprises a neck portion and a head portion, the head portion having a wider axial cross-section than an axial cross-section of the neck portion; and wherein the protrusion is configured to couple and decouple the cutlery utensil and the second cutlery utensil via relative movement of the cutlery utensil and the second cutlery utensil in a direction along the longitudinal axis.

2. The cutlery utensil of claim 1, wherein the protrusion is configured to couple the cutlery utensil and the second cutlery utensil via relative movement of the cutlery utensil and the second cutlery utensil in a first direction along the longitudinal axis, and decouple the cutlery utensil and the second cutlery utensil via relative movement of the cutlery utensil and the second cutlery utensil in an opposite second direction along the longitudinal axis.

3. The cutlery utensil of claim 1, wherein the channel is configured to receive at least a portion of a protrusion of the third cutlery utensil.

4. The cutlery utensil of claim 1, wherein the axial cross-section of the head portion comprises one of a rectangular shape, a circular shape, triangular shape, and a star shape.

5. The cutlery utensil of claim 1, wherein the channel has an axial cross-sectional shape configured to receive at least a head portion of a protrusion of the third cutlery utensil.

6. The cutlery utensil of claim 1, wherein the channel extends along at least a portion of the longitudinal axis of the handle.

7. The cutlery utensil of claim 1, wherein a length of the channel is less than half of a length of the handle.

8. The cutlery utensil of claim 1, wherein the protrusion comprises a portion configured to detach from the cutlery utensil.

9. The cutlery utensil of claim 1, wherein the channel extends along the longitudinal axis of the handle to an end of the handle.

10. The cutlery utensil of claim 1, wherein the channel extends along the longitudinal axis of the handle and terminates a distance from an end of the handle.

11. A plurality of cutlery utensils comprising at least two of the cutlery utensils of claim 1, wherein at least a portion of a protrusion of a first one of the plurality of cutlery utensils is received within a channel of a second one of the plurality of cutlery utensils.

12. The plurality of cutlery utensils of claim 11, wherein the protrusion of the first one of the plurality of cutlery utensils and the channel of the second one of the plurality of cutlery utensils are configured such that the first surface of the first one of the plurality of cutlery utensils is spaced apart from the second surface of the second one of the plurality of cutlery utensils.

13. The cutlery utensil of claim 1, wherein the head portion has a longer longitudinal cross-section than a longitudinal cross-section of the neck portion.

14. The cutlery utensil of claim 1, wherein the channel comprises a wider portion configured to receive at least a portion of a protrusion of the third cutlery utensil and a narrower portion configured to retain the protrusion of the third cutlery utensil.

15. The cutlery utensil of claim 14, wherein the channel further comprises a tapered portion positioned between the wider portion and the narrower portion.

16. The cutlery utensil of claim 14, wherein the channel further comprises a shoulder positioned between the wider portion and the narrower portion.

17. The cutlery utensil of claim 1, wherein the handle comprises a plurality of protrusions disposed on the first surface and configured to separably couple the cutlery utensil and the second cutlery utensil.

18. The cutlery utensil of claim 17, wherein the handle comprises a plurality of channels defined in the second surface and configured to separably couple the cutlery utensil and the third cutlery utensil.

19. The cutlery utensil of claim 1, wherein the protrusion is disposed on the first surface near an end of the handle.

20. The cutlery utensil of claim 19, wherein the channel is defined in the second surface near an end of the handle.

* * * * *